(12) United States Patent
Baumgarten et al.

(10) Patent No.: US 9,043,956 B2
(45) Date of Patent: Jun. 2, 2015

(54) METHOD FOR OPERATING AN AGRICULTURAL WORKING MACHINE (71) Applicant: CLASS SELBSTFAHRENDE ERNTEMASCHINEN GMBH, Harsewinkel (DE)

(72) Inventors: Joachim Baumgarten, Beelen (DE); Sebastian Neu, Bad Laer (DE); Andreas Wilken, Bissendorf (DE); Christoph Heitmann, Warendorf (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 0 days.

(21) Appl. No.: 14/036,196

(22) Filed: Sep. 25, 2013

(65) Prior Publication Data
US 2014/0088840 A1  Mar. 27, 2014

(30) Foreign Application Priority Data

Sep. 27, 2012 (DE) .......... 10 2012 109 163
Nov. 22, 2012 (DE) .......... 10 2012 111 253

(51) Int. Cl.
*E02F 9/20* (2006.01)
*A01D 41/127* (2006.01)
*B60K 28/06* (2006.01)

(52) U.S. Cl.
CPC .............. *A01D 41/127* (2013.01); *B60K 28/06* (2013.01); *B60W 2540/22* (2013.01)

(58) Field of Classification Search
None
See application file for complete search history.

(56) References Cited

U.S. PATENT DOCUMENTS

| 6,863,604 | B2 * | 3/2005 | Behnke ............... 460/6 |
| 7,343,234 | B2 * | 3/2008 | Kameyama ............ 701/36 |
| 7,982,620 | B2 * | 7/2011 | Prokhorov et al. ....... 340/576 |
| 8,019,517 | B2 * | 9/2011 | Boenig et al. .......... 701/50 |
| 8,305,234 | B2 * | 11/2012 | Tauchi et al. .......... 340/901 |
| 8,428,930 | B2 * | 4/2013 | Bohizic et al. .......... 703/26 |
| 2002/0109602 | A1 * | 8/2002 | Shinada et al. ......... 340/576 |
| 2003/0066277 | A1 | 4/2003 | Behnke |
| 2003/0218544 | A1 * | 11/2003 | Shinada ............... 340/575 |
| 2007/0241915 | A1 * | 10/2007 | Basson et al. .......... 340/576 |
| 2009/0088932 | A1 * | 4/2009 | Diekhans et al. ........ 701/50 |
| 2010/0134302 | A1 * | 6/2010 | Ahn et al. ............. 340/576 |
| 2010/0217474 | A1 * | 8/2010 | Baumgarten et al. ...... 701/29 |
| 2013/0205934 | A1 * | 8/2013 | Schwenk et al. ......... 74/494 |

FOREIGN PATENT DOCUMENTS

DE    101 47 733    4/2003

* cited by examiner

*Primary Examiner* — John R Olszewski
*Assistant Examiner* — James M McPherson
(74) *Attorney, Agent, or Firm* — Michael J. Striker (57) ABSTRACT

A method for operating an agricultural working machine that is configured with working assemblies, a control/regulating unit having a display unit and at least one interface for communication in order to control and/or regulate the working assemblies. In the method, an emotional state of an operator is recognized during an interaction with the working machine via the at least one interface and the operating mode of the working machine is adapted to the emotional state of the operator.

22 Claims, 4 Drawing Sheets

METHOD FOR OPERATING AN AGRICULTURAL WORKING MACHINE

CROSS-REFERENCE TO A RELATED APPLICATION

The invention described and claimed hereinbelow is also described in German Priority Document DE 10 2012 109163.3, filed on Sep. 27, 2012 and German Priority Document DE 10 2012 111253.3 filed on Nov. 22, 2012. The German Priority Documents, the subject matter of which are incorporated herein by reference, provide the basis for a claim of priority of invention under 35 U.S.C. 119(a)-(d).

BACKGROUND OF THE INVENTION

The invention relates to a method for operating an agricultural working machine which comprises a multiplicity of working assemblies, a control/regulating unit with a display unit and an interface for communication in order to control and/or regulate the working assemblies.

As is known, operation of an agricultural working machine is typically managed and parameterized by an operator. This operator interaction to manage and parameterize the machine requires an interaction by the operator with a control/regulating unit. The control/regulating unit generally comprises a display unit and means for data input and is used to control and/or regulate working assemblies of the agricultural working machine. Operators not only have to guide the working machine, but also must enter, monitor and correct the settings for the working assemblies. And, if so-called driver assistance systems are used to regulate the agricultural working machine, the operator must at least monitor the working process.

If a critical situation or a hazardous situation occurs, the operator must respond to related messages from the control/regulating unit, which are output acoustically and/or optically by this control/regulating unit. The manner in which such messages are responded to depends on the qualification of the operator, the ergonomy of the operating environment on the working machine, and on the motivation and/or emotional state of the operator.

SUMMARY OF THE INVENTION

The present invention overcomes the shortcomings of known arts, such as those mentioned above.

To that end, the present invention provides a method for operating an agricultural working machine that helps to reduce the misoperation of the working machine by an operator and, thereby minimize efficiency losses resulting therefrom.

In an embodiment, the method is implemented in/as agricultural working machine with working assemblies, a control/regulating unit with a display unit and an interface for communication in order to control and/or regulate the working assemblies, wherein an emotional state of an operator during an interaction with the working machine via the at least one interface is recognized, and the operating mode of the working machine is adapted to the emotional state of the operator.

Use of the method results in an improvement in the economic success of the use of the agricultural working machine, which is decisively dependent on the manner in which the operator handles the working machine, which, in turn, is affected by the emotional state of the operator. That is, the working machine adapts the process behavior and communication thereof with the operator to the emotional state of the operator. Moreover, a positive bond of the operator with the working machine can be achieved since the working machine can adapt to the operator, whereby the operator is drawn into greater involvement with the processes of the working machine in order to increase his understanding of the process sequences.

In particular, the emotional state of an operator that is recognized can be a complex of properties, by means of which the communication of the operator with the interface to the working machine is influenced. This complex of properties comprises emotional states such as aggressive or defiant behavior, unsure and/or nervous behavior, dissatisfaction or boredom, exhaustion or overload, satisfaction and a motivated behavior of the operator.

Preferably, at least one interaction of an operator with the control/regulating unit is evaluated by this control/regulating unit in order to deduce the emotional state of an operator. Depending on the result of the evaluation, an operating mode can be activated from a selection of at least two operating modes of the control/regulating unit. The evaluation of at least one interaction, preferably a plurality of interactions, takes place via comparison with data that characterize an emotional state of the operator and that are stored in the control/regulating unit, in order to decide which operating mode appears to be most suitable for the operator at the moment.

By targeted selection of an operating mode of the control/regulating unit in reaction to a currently prevailing emotional state of the operator, the communication and handling of the control/regulating unit adapts thereto in order to reduce the risk of an operator error or an inefficient mode of operation of the agricultural working machine (for example due to the operator paying less attention to handling). The selection of an operating mode of the control/regulating unit that is adapted to the prevailing emotional state of the operator is subject to fluctuations that occur over a longer period of time and affect the mode of operation and efficiency of the working machine.

In order to compensate for these effects, a check and an evaluation of an interaction are repeatedly performed. The targeted selection of the operating mode by the control/regulating unit makes it possible to make the operation of the working machine less dependent on the manner in which handling is performed (which results from the particular emotional state), and on the communication with the agricultural working machine. That is, even if the working machine is not operating within the range of the economic optimum, it is possible to ameliorate or prevent disadvantageous concomitant phenomena resulting from emotional states such as uncertainty, overload or boredom. In addition, the emotional state of the operator is positively influenced by the adaptation of the communication and the operating behavior of the working machine.

Preferably, when interaction with the control device takes place, the handling thereof is detected via the means for data input. The manner in which the operator physically interacts with the means for data input is evaluated in order to deduce the emotional state and to activate an appropriate operating mode. This approach to gathering data for evaluating the emotional state of an operator has the advantage that it is relatively objective, since the manner of handling is subconsciously controlled.

The mechanical action on the means for data input can be detected in order to recognize the handling. To this end, the pressure applied to the means for data input, i.e., the buttons, for example, is measured. It is also possible to measure the acceleration with which a button is actuated. The use of control levers having buttons disposed thereon as the means for data input, i.e., so-called multifunctional levers, can be evaluated in a similar manner in terms of the handling thereof by an operator.

For example, a resistivity measurement can be carried out at the means for data input in order to recognize the handling. In this measurement, the wetness of the fingertip used to actuate the button or of the hand surface used to actuate a switch element is detected, either of which can indicate that the operator is unsure or nervous.

Furthermore, physical data of the operator, such as pulse rate, blood pressure, eye movement or hand temperature can be detected and evaluated in order to better assess the particular emotional state, or, a reaction time to a request for input can be detected in order to recognize the handling.

The attention level of the operator can be deduced on the basis of the time it takes for the operator to respond to a request for input. This reaction time is characteristic of an emotional state of the operator. Operating modes can be oriented thereto, which display tasks on the display unit at an earlier point in time than is standard therefor, in accordance with a rapid, normal, or slow reaction to a request for input, in order to provide the operator with enough time to make a qualified decision. For example, it is therefore possible to compensate for the moment of surprise that occurs when a warning message appears.

The invention also detects duration of actuation of the means for data input in order to recognize the handling and additionally, or alternatively, the invention detects the repetition frequency of an actuation of the means for data input in order to recognize the handling.

In an embodiment, the control/regulating unit addresses the operator in a targeted manner depending on the emotional state of the operator. To this end, a plurality of preformulated questions are provided, i.e., suggestive questions that can be answered with a limited selection of answers and that enable conclusions to be drawn about the emotional state of the operator. Alternatively, a direct question is provided after the emotional state of the operator is assessed, which the operator can select accordingly from a selection of possible responses. The targeted address is used exclusively to draw conclusions about the emotional state of the operator, or in combination with one or more of the above-described method steps.

Advantageously, the method is carried out whenever the working machine is started up, which ensures that the control device and the working machine are operated in an operating mode that appears to be most economical.

In particular, the method is carried out for the first time after a predefinable period of operation of the working machine.

Preferably, the method is carried out repeatedly in predefinable time intervals, which makes it possible to respond to changes in the emotional state of the operator that occur naturally over the course of a working day.

Also, the invention relates to an agricultural working machine with a control/regulating unit designed to recognize the emotional state of an operator in respect of communication with the working machine, and the control/regulating unit is designed to derive the handling of the working machine on the basis of the emotional state that is recognized, and the control/regulating unit is designed to adapt the manner in which the working machine communicates with the operator to the emotional state of the operator.

Preferably, the control/regulating unit evaluates at least one interaction of an operator with the control/regulating unit in order to draw conclusions about the emotional state of an operator and, depending on the evaluation, to activate an operating mode from a selection of at least two operating modes of the control/regulating unit.

In a variation, the control/regulating unit comprises an evaluation unit that is connected to at least one sensor that is designed to detect a measurement quantity that permits a conclusion to be drawn about an operating behavior of an operator. To this end, the control/regulating unit evaluates the data provided by the at least one sensor and, on the basis of this evaluation, to decide which operating mode corresponds to the currently identified operating behavior; the sensor is designed to detect mechanical signals.

Alternatively or additionally, the sensor is designed to detect electrical or thermal signals. An example of a thermal sensor is a thermally sensitive resistor, the electrical resistance of which changes depending on the temperature.

Alternatively or additionally, the control/regulating unit is designed to detect, document, and evaluate the operator behavior.

Advantageously, the control/regulating unit is designed to perform the evaluation in settable time intervals. And, the control/regulating unit can be overridden via intervention by the operator in order to shut off the recognition.

Other ways to recognize the emotional state of an operator can include the optical detection of physical reactions by the operator, such as facial expressions, blinking frequency, or the like, by a camera.

BRIEF DESCRIPTION OF THE DRAWINGS

Further features and advantages of the invention will become apparent from the description of embodiments that follows, with reference to the attached figures, wherein.

DETAILED DESCRIPTION OF THE PREFERRED EMBODIMENTS

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

Figure 1:
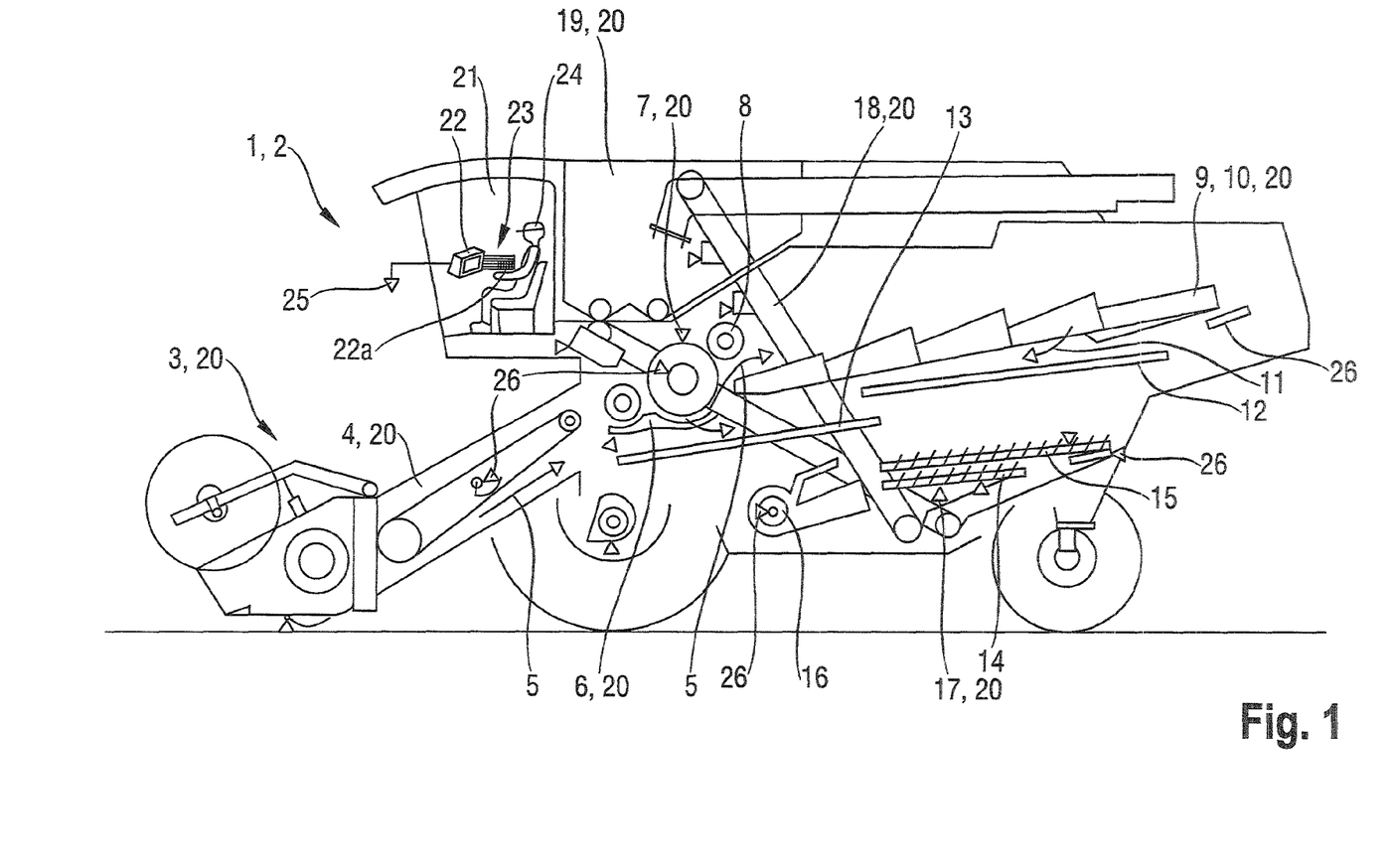
FIG. 1 presents a schematic side view of a combine harvester.

FIG. 1 shows a schematic representation of an agricultural working machine 1, which is designed as a combine harvester 2 and comprises a grain-cutting device 3 in the front region thereof. The grain-cutting device 3 is connected in a manner known per se to the feed rake 4 of the combine harvester 2. The crop flow 5 passing through the feed rake 4 is transferred in the upper, rear region of the feed rake 4 to the threshing parts 7 of the combine harvester 2, which are at least partially enclosed on the underside by a concave 6. A guide drum 8 disposed downstream of the threshing parts 7 redirects the crop stream 5 exiting the rear region of the threshing parts 7 in such a way that this crop stream is transferred directly to a separating device 10. The separating device is designed as a tray-type shaker 9 in the exemplary embodiment shown. It lies within the scope of the invention for the combine harvester 2 to comprise, instead of the tray-type shaker 9, a separating device 10 which is known per se and is therefore not shown, and which is designed as a separating rotor.

The crop stream 5 is conveyed on the oscillating tray-type shaker 9 in such a way that any unencumbered grains 11 contained in the crop stream 5 are separated out in the region underneath the tray-type shaker 9. The grains 11 that are separated out at the concave 6 and on the tray-type shaker 9 are directed via the return pan 12 and the feed pan 13 to a cleaning device 17, which comprises a plurality of sieve levels 14, 15, and a fan 16. Finally, the cleaned crop stream is transferred via elevators 18 to a grain tank 19. In the following, the grain-cutting device 3, the feed rake 4, the threshing parts 7 and the concave 6 assigned thereto, the separating device 10, the cleaning device 17, the elevators 18, and the grain tank 19 are referred to as the working parts 20 of the agricultural working machine 1.

The agricultural working machine 1 further comprises a driver's cab 21, in which at least one control/regulating unit 23 is disposed. The control/regulating unit is equipped with a display unit 22 and an input unit 22a, which can be designed as a keypad or a touchscreen, for example. Using the input unit, the control/regulating unit a plurality of processes that influence the operating mode of the individual working parts 20 is controlled automatically or is initiated by an operator 24 of the agricultural working machine 1. The input unit 22a or a display unit 22 designed as a touchscreen are interfaces for communication with the control/regulating unit 23. A further interface for communication can be in the form of a microphone and loudspeakers in order to provide instructions in verbal form, and to permit the control/regulating unit 23 to provide the operator 24 with questions, information, and warning messages in acoustic form.

The control/regulating unit 23 communicates via a bus system 25 in a manner known per se with a plurality of sensor systems 26. The sensor systems are used, for example, to detect the layer thickness in the feed rake 4, the cylinder speed of the threshing units 7, and the fan speed of the fan 16 (to mention, without limitation, just a few operating parameters that can be detected by means of sensors). Details regarding the structure of the sensor system 26 are provided in DE 101 47 733 A1, the entire contents of which are hereby incorporated in the disclosure of this patent application. Consequently, the structure of the sensor systems 26 is not described once more in the following.

Figure 2:
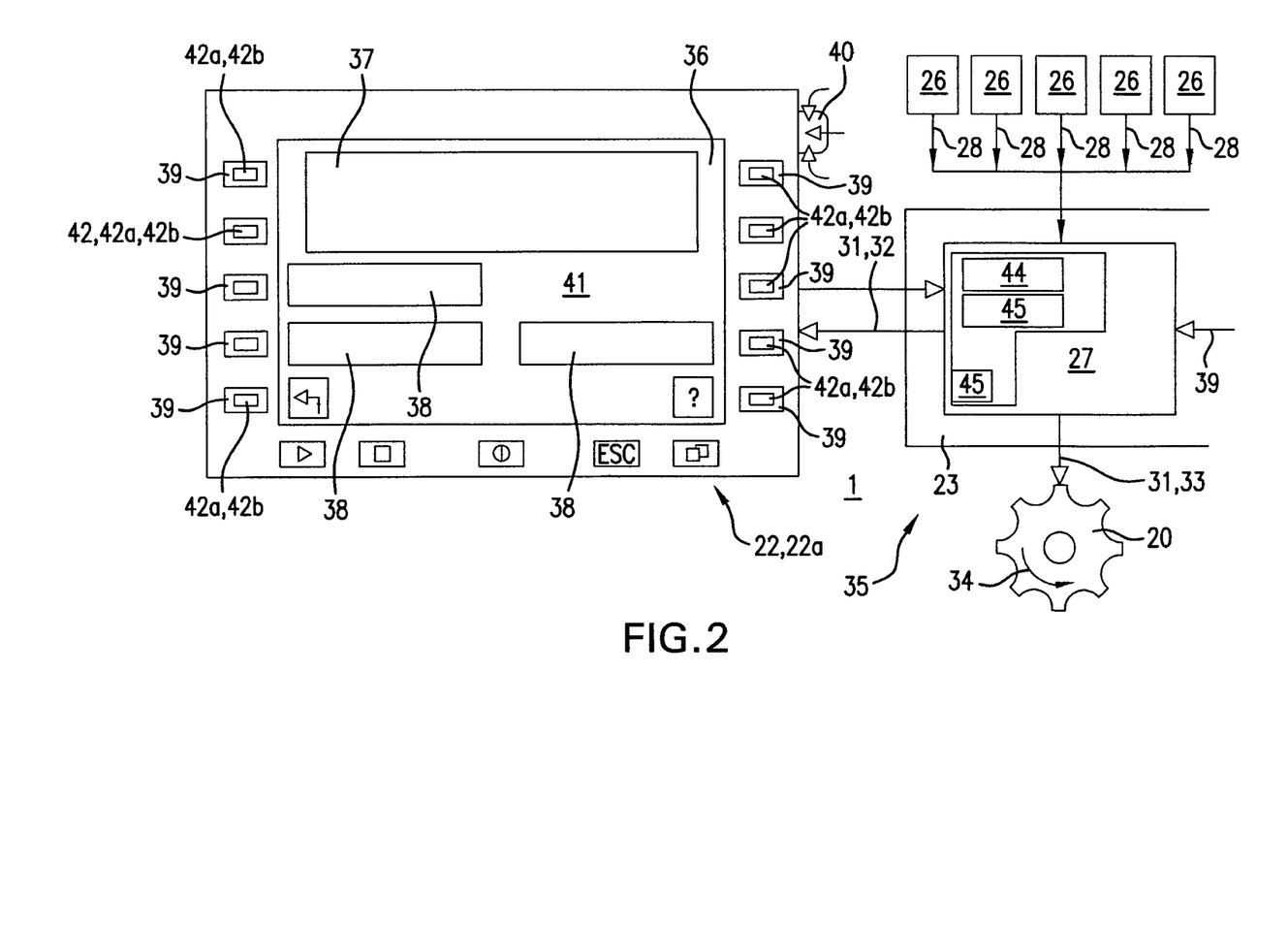
FIG. 2 presents a schematic representation of a display unit.

FIG. 2 shows a schematic representation of the display unit 22 and the input unit 22a, which are designed as buttons 39 as shown and are disposed in a frame enclosing the screen of the display unit 22. FIG. 2 also shows the arithmetic logic unit 27, which is assigned to the control/regulating unit 23 and is coupled to the display unit 22. The arithmetic logic unit 27 is designed such that this may process information 28 generated by the sensor systems 26, as well as external information 29, and information 30 stored in the arithmetic logic unit 27 itself, such as expert knowledge, for example, to obtain a plurality of output signals 31.

The output signals 31 comprise at least display control signals 32 and working part control signals 33. The display control signals determine the contents of the display unit 22 and the working part control signals initiate the change of different working parameters 34 of the working parts 20 of the agricultural working machine 1. The arrow 34 symbolizes the working parameter "cylinder speed". The control/regulating unit 23, including the display unit 22 and the arithmetic logic unit 27 assigned thereto, are components of the driver assistance system 35 according to the present invention. The display unit 22 thereof enables interactive, natural-language communication to take place between the operator 24 and the driver assistance system 35 in a display area 36.

The display area 36 of the display unit 22 comprises one or more notice fields 37 as well as selection fields 38 for activating various process sequences. The particular selection field 38 is activated directly using buttons 39 assigned to the particular selection field 38, and/or using a central navigation knob 40 (which is rotated and pressed to navigate between the various selection fields 38) and/or by the operator 24 touching the particular selection field 38 directly, provided the display area 36 is designed as a touchscreen monitor 41. After a selection field 38 has been activated, a software module 44 stored in the arithmetic logic unit 27 of the control/regulating unit 23 is activated. The software module brings about an optimization of the working parameters 34 of the working parts 20 with consideration for information 30 stored in the arithmetic logic unit 27, and the external and internal information 28, 29 that is available.

Disposed underneath the buttons 39 are pressure sensors 42 and/or acceleration sensors 42a and/or moisture sensors 42b, which are used to detect the pressure applied by the operator 24 to actuate the button 39, or to detect the acceleration acting on the button or the moisture present upon actuation. The at least one signal provided by the particular pressure sensor 42 and/or the acceleration sensor 42a and/or the moisture sensor 42b is fed, as input signals 43, to the arithmetic logic unit 27. Upon actuation of the buttons 39, the length of time that the operator 24 presses down on the button 39 also is detected. In addition, the length of time that passes between the appearance of a message on the display unit 22 and the reaction to this message by the operator 24 is detected. The repeat frequency of actuation of the same button 39 when an entry is made is also detected. Signals representing the length of time and the repeat frequency are fed, as input signals 43, to the arithmetic logic unit 27.

The input signals 43 fed to the arithmetic logic unit 27 are processed by a software module 44, 45, so that, on the basis of the input signals 43, conclusions can be drawn about the emotional state (i.e., the current general frame of mind of the operator 24). To this end, characteristic standard value ranges for the quantities of pressure, acceleration, moisture, temperature, time or repeat frequency and the like (which are listed as examples and can be detected by means of sensors) for various emotional states or basic frames of minds, are stored in the control/regulating unit 23 and are used for comparing and evaluating the actual values that are detected. The actual basic frame of mind of the operator 24 is deduced on the basis of the comparison.

In response to the detection of the basic frame of mind, which is determined by comparing the actual values with the standard value ranges, the control/regulating unit 23 is operated in an operating mode that appears to be the most suitable for accommodating the basic frame of mind of the operator 24 that was identified or to improve this basic frame of mind. The standard value ranges that can be defined for the detectable measurement quantities permit a broader diversity in the gradation in order to differentiate between button pressure that is strong, normal, or weak, for example. The same applies for the detectable quantities of acceleration, moisture, temperature, time, or repeat frequency.

Settings related to communication with the operator 24, at least some of which can deviate from one another, are set in the different operating modes in which the control/regulating unit 23 can be operated. For example, communication with an operator 24 whose emotional state is deemed to be rather motivated can be better adapted to this operator by configuring the display on the display unit 22 to be more detailed. That is, the display is configured with a greater number of relevant operating parameters is displayed and the screen has a high information density.

In the event that the operator appears to be relatively unsure, the information presented on the display unit is reduced to only that which is essential. An aggressive or defiant frame of mind of the operator 24 can also result in the display of operating parameters being reduced to only that which is essential, and wherein the configuration of the display also is influenced (for example by means of background colors or the like), in order to achieve the most calming effect possible. Moreover, the manner in which the working machine 1 reacts to changes made to setting parameters of working parts 20 can be changed in accordance with the operating mode, which is set depending on the basic frame of mind that is detected; this is explained in the following.

For example, a repeated forceful pressing of the button indicates a basic frame of mind that corresponds to aggressive behavior of the operator. In the operating mode of the control/regulating unit 23 corresponding thereto, for example, the scope of information that is displayed is limited (e.g., the information is limited to only that which is essential). For example, only that information is displayed that indicates a pending critical situation for the working machine 1 or individual working assemblies 20 during the harvesting process. Accordingly, the point in time at which a warning message is displayed is moved back as compared to the conventional operating mode, thereby prompting the operator 24 to take action more quickly. The communication by the control/regulating unit with the operator 24 by means of queries is reduced in order to relieve the operator. Reactions by the working machine 1 that are available according to the selected operating mode include changing setting parameters at greater intervals and shorter waiting times for the query by the control/regulating unit 23 regarding the efficacy of a setting that was changed.

An operator 24 who actuates the buttons 39 with only slight pressure and a time delay, and about whom increased moisture values are detected by the moisture sensor 42b, is deemed to have a basic frame of mind indicating that the operator 24 is behaving as if he is unsure. Therefore, the control/regulating unit sets an operating mode, by means of which the operator 24 receives greater guidance if the objective is to optimize the operating behavior of the working machine 1 by changing one or more settings of the working assemblies 20.

To this end, in this operating mode, the operator 24 is provided with more information about the effects of the proposed settings of the working assemblies. In this way, the optimization procedure is made more transparent for the operator 24. In particular, a finely tuned optimization of one or more working assemblies 20 is at least temporarily abandoned. In this case, the working machine automatically implements measures to counteract hazardous situations, which would need to be handled rapidly and with confident reactions, without having to wait for the operator 24 to respond. For example, in the event of a pending crop backlog in the front attachment 3 or the working machine 1, a countermeasure can be automatically initiated, while related notifications regarding the hazardous situation are signaled to the operator 24 in parallel, who must respond. It is thereby possible to prevent further-reaching negative effects of a hazardous situation resulting from a time-delayed reaction by an operator 24 classified as behaving as if he is unsure.

The presence of a basic frame of mind indicating that the operator 24 is dissatisfied or bored is detected (by the control/regulating unit 23) in that the operator 24 reacts to prompts from the control/regulating unit 23 not at all or with delay. A further indication of this basic frame of mind is the capacity utilization of the working machine. Capacity utilization can be derived from the detection of the crop throughput, for example. In addition, the frequency with which the operator 24 calls up a help menu of the control/regulating unit 23 or the driver assistance system 35, and the intensity of the use are recorded and evaluated.

When the operator 24 calls up the help menu often without navigating deeply into the menu structure, and this is considered in combination with the other aforementioned indicators, this operator is deemed to be dissatisfied or bored. The control/regulating unit 23 reacts to this detected basic frame of mind by switching to an operating mode in which the operator 24 is drawn into greater involvement in the control processes of the working machine. This takes place in the form of a targeted, natural-language interaction with the operator 24, in which questions regarding a possible potential for improvement are posed to this operator. For example, questions can be posed to the operator 24 regarding the information density that can be displayed or the reaction speed of the control/regulating unit 23, which the operator 24 can answer accordingly.

Furthermore, in this operating mode, warning messages are displayed sooner than is the case in a standard setting. And warning messages that are generated by the control/regulating unit 23 are presented in greater detail, thereby enabling the operator 24 to understand a potential problem more easily and quickly. The reactions the working machine 1 can make according to the selected operating mode are to adjust or retain standard values with respect to the reaction times to settings and to adjust or retain control parameters for optimizing the working parts 20.

The operator 24 is deemed to have a basic frame of mind indicating he is calm and satisfied or motivated when the reactions of the operator 24 to prompts by the control/regulating unit 23 are detected as taking place immediately. The pressure applied by the operator 24 on the buttons 39 and detected by the pressure sensors 42 is normal, that is, the button pressure that is detected corresponds to a definable standard value range that is representative of a normal button pressure, and the control/regulating unit 23 does not detect repeated actuation of a button 39. The reactions to prompts by the control/regulating unit 23 or the driver assistance system 35 take place with a time interval defined as immediate or rapid, and the length of time of actuation of one of the buttons 39 is shorter. Moreover, the operator 24 uses the help functions more intensively and navigates more deeply into the menus in order to obtain more information.

In response to this basic frame of mind that is detected, an operating mode is set that provides the operator 24 with additional information, in cycles, on the processes and the potential for improvement thereof, in order to encourage the operator 24 to use other settings that can result in an improvement of the working result. The operator 24 also is provided with the opportunity to make his own decision regarding the information density. The working machine 1 is operated accordingly in the selected operating mode in response to the basic frame of mind that is detected and indicates that the operator 24 is calm and satisfied or motivated.

The setting parameters are changed in intervals of normal size, wherein an optimal reaction time is used, that is, a reaction time that adequately accounts for the start-up procedure after a setting parameter is changed. The control parameters for optimizing the working parts 20 are set such that an optimal output or efficiency of operation of the working machine 1 is achieved under the currently prevailing operating conditions. In contrast to an operator 24 who is deemed to be acting in an unsure manner, when an operator 24 is deemed to be motivated, the extent of tasks implemented automatically by the working machine is reduced in order to maintain the motivation of the operator by involving him more closely in the operating procedure, even in critical operating situations.

The objective of selecting an operating mode depending on the basic frame of mind that is detected is to prevent negative effects on the operation and efficiency of the working machine 1. This is achieved in that, after the operator 24 interacts with the working machine 1, information is ascertained and evaluated by the control/regulating unit 23. This information results from the operating behavior of the operator 24 so that, depending thereon, an operating mode of the working machine 1 and the control/regulating unit 23 can be selected that is adapted to the basic frame of mind and the resultant operating behavior of the operator 24.

In addition to a detection of the aforementioned quantities that can be detected by means of sensors, such as pressure, acceleration, moisture, temperature, time or repeat frequency, the operator 24 also can be addressed by the driver assistance system 35, by means of targeted questions, in order to confirm the assessment of the basic frame of mind of the operator 24 (which was deduced on the basis of the quantities detected by means of sensors).

Figure 3:
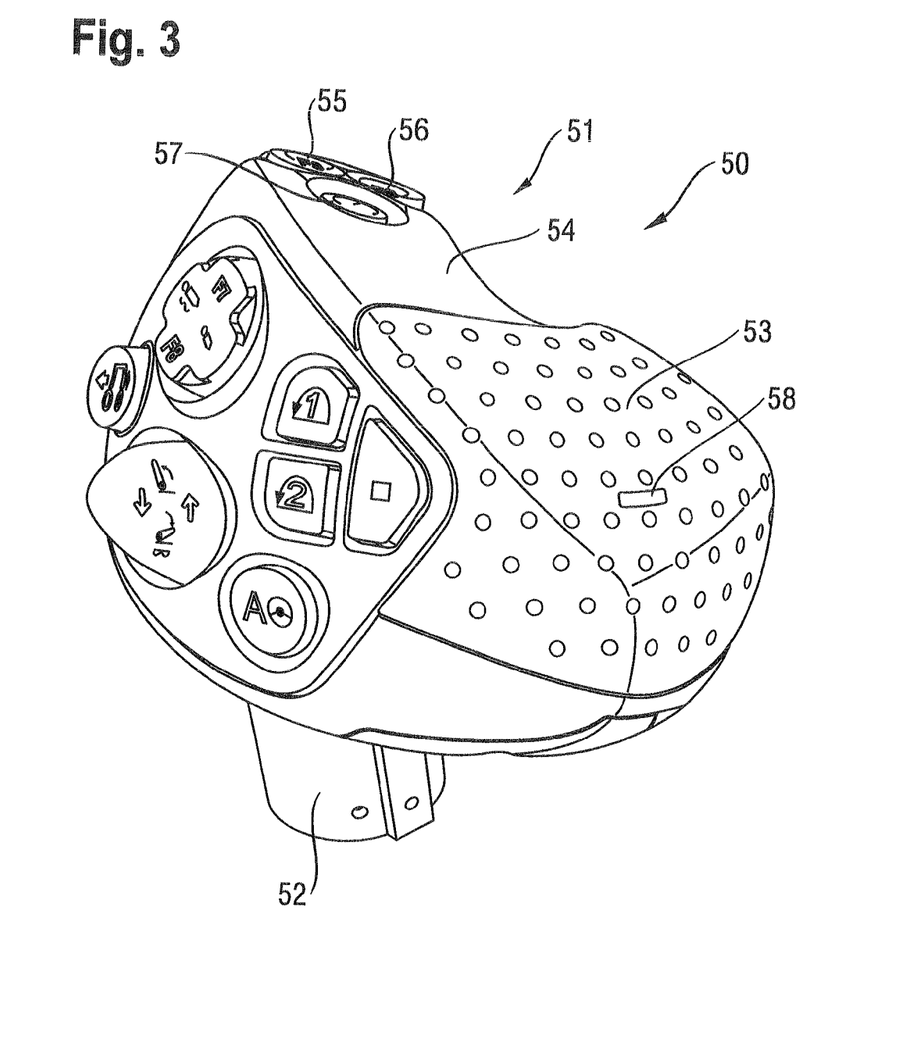
FIG. 3 presents a perspective view of a multifunctional handle.

FIG. 3 shows a perspective view of a handle head 51 of a multifunctional handle 50, which is used by the operator 24 to control the working machine 1. A hollow neck 52 is integrally formed on the underside of the handle head 51, and accommodates a shaft of the multifunctional handle 50 (not shown in FIG. 3) and connects the handle head 51 to a joint in the instrument panel. The handle head 51 is irregularly shaped and therefore individual sides are not sharply delineated from each other but instead transition continuously into each other at edges that are rounded off to a more or less greater extent. Yet, a continuous surface is identifiable that is curved relatively slightly, is disposed on a top side that is approximately diametrically opposed to the neck 52. The continuous surface includes a gripping surface 53 in the region thereof facing the driver that is adapted to the shape and size of a driver's palm, and, adjacent thereto in the direction of travel, the continuous surface includes a control field 54.

As shown in FIG. 3, the gripping surface 53 has small recesses distributed thereon and three control elements 55, 56, 57 that are provided on the control field 54. The control elements 55, 56 are used, for example, to set a setpoint speed of a "Tempomat" function of the working machine 1. In contrast thereto, when the Tempomat function is inactive, the ground speed of the working machine 1 is controlled by displacing the entire handle in the direction of travel or opposite thereto. The interaction of the operator 24 with the multifunctional handle 50 is detected and evaluated in a comparable manner (as is the case with the interaction of the operator with the input unit 22a). In this case it is possible to use suitable sensors, such as conductance sensors or pressure sensors, to detect the acceleration of the multifunctional handle 50 (for example, upon actuation thereof to regulate the ground speed).

The gripping surface 53 also allows moisture to be measured by means of a conductance sensor disposed thereon. The multifunctional handle 50 allows temperature to be measured by means of a temperature sensor 58 such as a thermally sensitive resistor, which can be disposed in the handle head 51. As a result, one of several physical quantities of the operator 24 can be detected, on the basis of which information can be derived regarding the emotional state of the operator 24.

Figure 4:
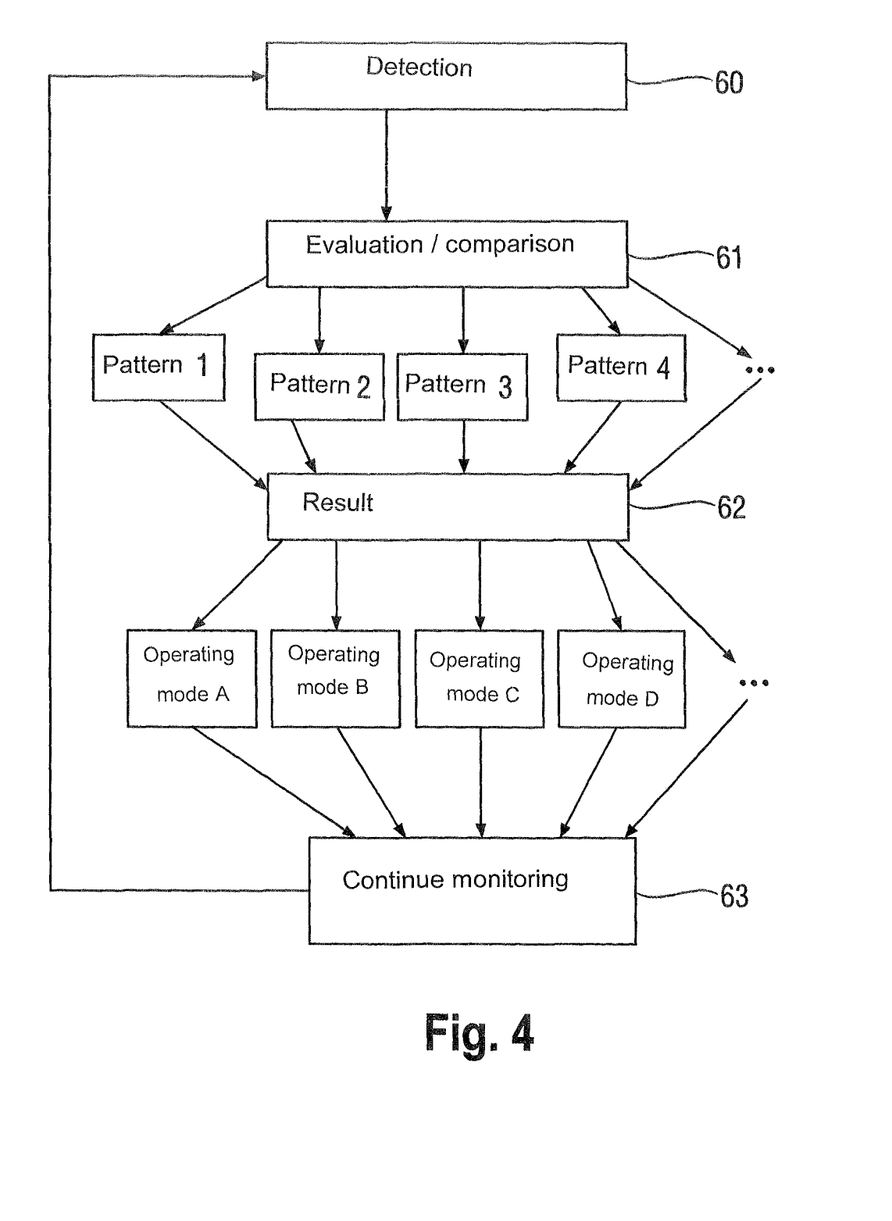
FIG. 4 presents a flow chart to illustrate the steps involved in detecting and evaluating the operating behavior.

FIG. 4 shows a flow chart that explains the process for detecting and evaluating the operating behavior and, derived therefrom, the basic frame of mind of the operator and the measures introduced as a result. In a first step 60, the operating behavior of the operator 24 is detected. This can take place immediately after start-up of the working machine 1, or not until a later point in time (for example, when the working machine 1 has been operating for longer than a specifiable period of time). The operating behavior is detected on the basis of the detection of at least one of the various measurement quantities that were listed above in a non-conclusive manner.

In a second step 61, the detected measurement quantities are evaluated by means of a setpoint-actual value comparison with standard value ranges stored in the control/regulating unit 23 as the setpoint value intervals for the quantities that can be detected by sensors. The particular setpoint value intervals represent different operating behaviors, which are assigned to various basic frames of mind. To this end, various patterns M1, M2, M3, . . . are stored, each of which corresponds to a possible emotional state of the operator. The basic frame of mind is determined on the basis of at least one interaction with the working machine 1 and/or the driver assistance system 35. In addition, the evaluation can be verified in this second step, in that questions are posed to the operator 24 in a targeted manner. The questions are answered by the operator 24 by making a selection of possible statements depicted on the display unit 22. As an alternative to displaying questions and answers on the display unit 22, similar communication can be implemented by means of spoken output and speech recognition.

On the basis of the evaluation, an operating mode is selected, in a third step 82, from a number of several operating modes A, B, C, D, . . . depending on the basic frame of mind determined in the second step 61. The working machine 1 and the driver assistance system 35 are then operated, at least temporarily, according to this selected operating mode.

After the operating mode has been selected, the sensor-based detection according to the first step 60 is continued in a fourth step 63. Such operation ensures that in the event of a significant change of measurement values, an evaluation can be carried out once more according to the second step 61. The continuation of the sensor-based detection and the evaluation of the measurement values takes place in a repeating manner in specifiable time intervals. The point thereof is to prevent a frequent change in the operating mode when changing basic frames of mind are determined one after the other in short intervals. Another point, however, is to verify whether the selected pattern M1, M2, M3, . . . , which is characteristic for a specific emotional state, actually describes this. If the operating mode A, B, C, D, . . . selected on the basis of a pattern M1, M2, M3, . . . does not yield the desired result, a different pattern M1, M2, M3, . . . can be selected, which deviates slightly from the previously selected pattern. The operating mode A, B, C, D, . . . to be selected can also change depending on this pattern selection, which has changed.

Preferably, however, detection and evaluation always take place after an interruption in operation, the causes of which can differ. In particular, an unplanned interruption of the operation of the working machine due to maintenance work or the like often results in a significant, negative change in the basic frame of mind of the operator 24. In contrast, planned interruptions, such as a pause or travel from a field to be worked to another field can positively affect the basic frame of mind.

LIST OF REFERENCE CHARACTERS 1 working machine
2 combine harvester
3 grain-cutting device
4 feed rake
5 crop flow
6 concave
7 threshing parts
8 guide drum
9 tray-type shaker
10 separating device
11 grain
12 return pan
13 feed pan
14 sieve level
15 sieve level
16 fan
17 cleaning device
18 elevator
19 grain tank 19
20 working parts
21 driver's cab
22 display unit
22a input unit
23 control/regulating unit
24 operator
25 bus system
26 sensor system
27 arithmetic logic unit
28 information
29 external information
30 stored information
31 output signal
32 display control signal
33 working part control signal
34 working parameter
35 driver assistance system
36 display region
37 notice field
38 selection field
39 button
40 navigation knob
41 touchscreen monitor
42 pressure sensor
42a acceleration sensor
42b moisture sensor
43 input signal
44 software module
45 software module
50 multifunctional handle
51 handle head
52 neck
53 gripping surface
54 control field
55 control element
56 control element
57 control element
58 temperature sensor
60 first step
61 second step
62 third step
63 fourth step As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. A method for operating an agricultural working machine (1,2), comprising a plurality of working assemblies (20),
a control and regulating unit (23) having a display unit (22) and at least one interface (22, 22a) for communication in order to control and/or regulate the working assemblies (20), the method comprising the steps of:
the control and regulating unit (23) is configured to recognize an emotional state of an operator (24) during an interaction by the operator with the working machine (1, 2) via the at least one interface (22, 22a), and
the control and regulating unit (23) is configured to adapt an operating mode of the working machine (1,2) to the recognized emotional state of the operator (24) to prevent negative effects on operation and efficiency of the working machine.

2. The method according to claim 1, wherein the emotional state of the operator (24) that is recognized is a complex of properties that influence communication with the interface (22, 22a) to the working machine (1, 2).

3. The method according to claim 1, further comprising evaluating at least one interaction of the operator (24) with the control and regulating unit (23) by the control and regulating unit to deduce the emotional state of the operator (24) and, depending on the result of the evaluation, activating the operating mode from a selection of at least two operating modes of the control and regulating unit (23).

4. The method according to claim 1, further comprising recognizing a handling of the operator (24) in the event of an interaction of the operator (24) with the interface (22, 22a) for communication.

5. The method according to claim 1, further comprising detecting a mechanical action on means for data input (22a) order to recognize the handling.

6. The method according to claim 5, further comprising carrying out a resistivity measurement on the means for data input (22a) in order to recognize the handling.

7. The method according to claim 4, further comprising detecting a reaction time to a request for input to recognize the handling.

8. The method according to claim 4, further comprising detecting a duration of actuation of the means for data input (22a) to recognize the handling.

9. The method according to claim 4, further comprising detecting a repeat frequency of an actuation of the means for data input (22a) to recognize the handling.

10. The method according to claim 1, wherein the control and regulating unit addresses the operator (24) in a targeted manner depending on the emotional state of the operator (24).

11. The method according to claim 1, wherein the method is carried out whenever the working machine (1, 2) is started up.

12. The method according to claim 1, wherein the method is carried out for the first time after a predefinable period of operation of the working machine (1, 2).

13. The method according to claim 1, wherein the method is carried out repeatedly in predefinable time intervals.

14. An agricultural working machine (1,2) comprising:
a plurality of working assemblies (20); and a control and regulating unit for controlling and regulating the working assemblies (20);

wherein the control and regulating unit (23) comprises a display unit (22) and an interface (22, 22*a*) for communication with the display unit, and wherein the control and regulating unit (23) is configured to recognize an emotional state of an operator (24) during an interaction with the working machine (1, 2) via the interface (22, 22*a*), and to adapt an operating mode of the working machine (1,2) to the recognized emotional state of the operator (24) to prevent negative effects on operation and efficiency of the working machine.

15. The agricultural working machine (1,2) according to claim 14, wherein the control and regulating unit evaluates at least one physical interaction of the operator (24) with the control and regulating unit (23) and, depending on the evaluation, activates the operating mode from a selection of at least two operating modes of the control and regulating unit (23).

16. The agricultural working machine (1,2) according claim 14, wherein the control and regulating unit (23) comprises an evaluation unit (44, 45) connected to at least one sensor (42) designed to detect a measurement quantity that permits a conclusion to be drawn about an operating behavior of the operator (24).

17. The agricultural working machine (1, 2) according to claim 16, wherein the control and regulating unit (23) evaluates the data provided by the at least one sensor (42) and, on the basis of this evaluation, decides which operating mode corresponds to the currently identified operating behavior.

18. The agricultural working machine (1, 2) according to claim 14, wherein the sensor detects mechanical signals.

19. The agricultural working machine (1, 2) according to claim 14, wherein the sensor detects electrical or thermal signals.

20. The agricultural working machine (1, 2) according to claim 14, wherein the control and regulating unit (23) detects, documents, and evaluates the operating behavior.

21. The agricultural working machine (1,2) according to claim 14, wherein the control and regulating unit (23) performs the evaluation in settable time intervals.

22. The agricultural working machine (1, 2) according to claim 14, wherein the control and regulating unit (23) is overridden by an intervention by the operator (24), in order to shut off the recognition.

\* \* \* \* \*